US012767105B2

(12) United States Patent
Hong et al.

(10) Patent No.: US 12,767,105 B2
(45) Date of Patent: Oct. 20, 2026

(54) APPARATUS FOR CONTROLLING AUTONOMOUS DRIVING AND METHOD THEREOF

(71) Applicants: Hyundai Motor Company, Seoul (KR); Kia Corporation, Seoul (KR)

(72) Inventors: Jeong Ki Hong, Hwaseong-si (KR); Kyung Joo Bang, Hwaseong-si (KR); Jae Woong Hwang, Hwaseong-si (KR); Dong Hyuk Kim, Hwaseong-si (KR); Il Hwan Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 74 days.

(21) Appl. No.: 18/943,552

(22) Filed: Nov. 11, 2024

(65) Prior Publication Data

US 2025/0196827 A1 Jun. 19, 2025

(30) Foreign Application Priority Data

Dec. 13, 2023 (KR) ........................ 10-2023-0181215

(51) Int. Cl.

| | |
|---|---|
| ***B60T 8/58*** | (2006.01) |
| ***B60T 7/22*** | (2006.01) |
| ***B60T 8/171*** | (2006.01) |
| ***B60T 8/172*** | (2006.01) |
| ***B60T 8/74*** | (2006.01) |

(52) U.S. Cl.

CPC .................. *B60T 8/58* (2013.01); *B60T 7/22* (2013.01); *B60T 8/171* (2013.01); *B60T 8/172* (2013.01); *B60T 8/74* (2013.01); *B60T 2250/04* (2013.01)

(58) Field of Classification Search

CPC ... B60T 8/58; B60T 7/22; B60T 8/171; B60T 8/172; B60T 8/74; B60T 2250/04; B60T 7/12; B60T 8/72

See application file for complete search history.

(56) References Cited

U.S. PATENT DOCUMENTS 10,377,241 B2 * 8/2019 Inoue .................. B60L 15/2072

* cited by examiner

*Primary Examiner* — Jacob M Amick

(74) *Attorney, Agent, or Firm* — MORGAN, LEWIS & BOCKIUS LLP

(57) ABSTRACT

A vehicle control apparatus may include at least a brake, at least a sensor, a memory, and a processor. The vehicle control apparatus may identify, based on the at least a sensor, braking information including at least one of host vehicle driving speed, host vehicle acceleration, required acceleration, other-vehicle acceleration, whether to use the first brake, or braking pressure by the second brake, or any combination thereof if a braking trigger signal for a host vehicle is identified, and may perform, by selectively using the first brake and the second brake, braking control for the host vehicle based on the braking information.

20 Claims, 6 Drawing Sheets

APPARATUS FOR CONTROLLING AUTONOMOUS DRIVING AND METHOD THEREOF

CROSS-REFERENCE TO RELATED APPLICATION

The present application claims priority to Korean Patent Application No. 10-2023-0181215, filed on Dec. 13, 2023, the entire contents of which is incorporated herein for all purposes by this reference.

BACKGROUND OF THE PRESENT DISCLOSURE

Field of the Present Disclosure

The present disclosure relates to a vehicle control apparatus and a method thereof, and more, relates to a technology for performing, based on selectively using a plurality of braking devices, braking control on a host vehicle.

Description of Related Art

With the development of autonomous driving control and/or semi-autonomous driving control technology, a stable driving technology for a host vehicle may gradually become advanced. For example, if a situation requiring deceleration (or stopping) is identified while driving control is performed on the host vehicle, various algorithms performing braking control (or stopping control) need to be developed.

In the meantime, according to the type of a vehicle, there may be a vehicle provided with a plurality of braking devices. In a case of a host vehicle including a plurality of braking devices, the braking control may be performed further based on only some (e.g., an auxiliary braking device) of the braking devices, and then may be performed based on another braking device (e.g., a main braking device) after a specific period.

However, at a time point at which some braking devices (e.g., an auxiliary braking device) are not used in a process of using a plurality of braking devices together, an error may occur between required acceleration and driving amounts of braking devices. For example, at a time point at which braking devices stop or start operating, over-braking may occur where braking devices operate at a braking amount higher than the required acceleration calculated by a control device. Alternatively, under-braking where braking devices operate at a braking amount lower than the required acceleration may occur at a specific time point.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus which may perform, based on selectively using braking devices, stable and highly accurate braking control based on braking information including at least one of host vehicle driving speed, host vehicle acceleration, required acceleration, other-vehicle acceleration, whether to use a first brake, or braking pressure by a second brake, or any combination thereof.

Various aspects of the present disclosure are directed to providing a vehicle control apparatus which may perform braking control based on selectively adjusting magnitudes of the control amount corresponding to a first brake (e.g., auxiliary braking device) and the control amount corresponding to a second brake (e.g., a main braking device) depending on whether the first brake is used.

Various aspects of the present disclosure are directed to providing a vehicle control apparatus which may prevent, based on preferentially using the first brake, overheating and/or wear and tear occurring if a stronger braking force of the second brake continues to be used, and may selectively use the second brake depending on whether a predetermined condition is satisfied.

Various aspects of the present disclosure are directed to providing a vehicle control apparatus which may prevent over-braking and/or under-braking that occurs during the transition between usage modes of the first brake and the second brake, and may perform braking control that more accurately follows the required acceleration.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle driving control apparatus may include at least a brake including a first brake and a second brake, at least a sensor, a memory that stores at least one instruction, and controller operatively connected to the memory. For example, if executed by the processor, the at least one instruction may cause the vehicle control apparatus to identify, by use of the at least a sensor, braking information including at least one of host vehicle driving speed, host vehicle acceleration, required acceleration, other-vehicle acceleration, whether to use the first brake, or braking pressure by the second brake, or any combination thereof if a braking trigger signal for a host vehicle is identified, and to perform, by selectively using the first brake and the second brake, braking control for the host vehicle based on the braking information.

According to an exemplary embodiment of the present disclosure, if executed by the processor, the at least one instruction may cause the vehicle control apparatus to perform, based on the first brake, the braking control if the host vehicle driving speed exceeds first driving speed and the required acceleration exceeds first acceleration.

According to an exemplary embodiment of the present disclosure, if executed by the processor, the at least one instruction may cause the vehicle control apparatus to perform, by further using the second brake, the braking control if identifying that the host vehicle driving speed is smaller than or equal to the first driving speed, the required acceleration is smaller than or equal to the first acceleration, or an error between the required acceleration and the host vehicle acceleration is smaller than or equal to a predetermined error, while performing, by use of the first brake, the braking control.

According to an exemplary embodiment of the present disclosure, if executed by the processor, the at least one instruction may cause the vehicle control apparatus to perform, by use of the second brake, the braking control if the other-vehicle acceleration is smaller than or equal to second acceleration or the required acceleration is smaller than or equal to the second acceleration if the host vehicle driving speed is smaller than or equal to first driving speed, or the required acceleration is smaller than or equal to first acceleration.

According to an exemplary embodiment of the present disclosure, if executed by the processor, the at least one instruction may cause the vehicle control apparatus to perform, by use of the first brake and the second brake, the braking control if the other-vehicle acceleration exceeds second acceleration and the required acceleration exceeds the second acceleration if the host vehicle driving speed is smaller than or equal to first driving speed, or the required acceleration is smaller than or equal to first acceleration.

According to an exemplary embodiment of the present disclosure, if executed by the processor, the at least one instruction may cause the vehicle control apparatus to determine whether to use the first brake if at least one of the host vehicle driving speed, the required acceleration, the other-vehicle acceleration, or an error between the required acceleration and the host vehicle acceleration, or any combination thereof satisfies a predetermined condition, and to perform, by use of the first brake and the second brake, the braking control if it is identified that the first brake is not used.

According to an exemplary embodiment of the present disclosure, if executed by the processor, the at least one instruction may cause the vehicle control apparatus to determine whether to use the first brake if at least one of the host vehicle driving speed, the required acceleration, the other-vehicle acceleration, or an error between the required acceleration and the host vehicle acceleration, or any combination thereof satisfies a predetermined condition, and to decrease a control amount for the first brake if it is identified that the first brake is being used.

According to an exemplary embodiment of the present disclosure, if executed by the processor, the at least one instruction may cause the vehicle control apparatus to gradually decrease a first control amount for the first brake based on the same slope, and to increase a second control amount for the second brake to follow the required acceleration.

According to an exemplary embodiment of the present disclosure, if executed by the processor, the at least one instruction may cause the vehicle control apparatus to perform the braking control by use of the second brake based on the second control amount if the host vehicle acceleration, the required acceleration, and the braking pressure satisfy a predetermined condition.

According to an exemplary embodiment of the present disclosure, if executed by the processor, the at least one instruction may cause the vehicle control apparatus to determine that the predetermined condition is satisfied, if the host vehicle acceleration is smaller than or equal to third acceleration, the required acceleration is greater than or equal to fourth acceleration, and the braking pressure is greater than or equal to a predetermined value.

According to an aspect of the present disclosure, a vehicle control method may include identifying, by use of at least a sensor, braking information including at least one of host vehicle driving speed, host vehicle acceleration, required acceleration, other-vehicle acceleration, whether to use a first brake, or braking pressure by a second brake, or any combination thereof by a processor if a braking trigger signal for a host vehicle is identified, and performing, by selectively using the first brake and the second brake, braking control for the host vehicle based on the braking information by the processor.

According to an exemplary embodiment of the present disclosure, the vehicle control method may further include performing, by use of the first brake, the braking control by the processor if the host vehicle driving speed exceeds first driving speed and the required acceleration exceeds first acceleration.

According to an exemplary embodiment of the present disclosure, the vehicle control method may further include performing, by further using the second brake, the braking control by the processor if identifying that the host vehicle driving speed is smaller than or equal to the first driving speed, the required acceleration is smaller than or equal to the first acceleration, or an error between the required acceleration and the host vehicle acceleration is smaller than or equal to a predetermined error, while performing, by use of only the first brake, the braking control.

According to an exemplary embodiment of the present disclosure, the vehicle control method may further include performing, by use of the second brake, the braking control by the processor if the other-vehicle acceleration is smaller than or equal to second acceleration or the required acceleration is smaller than or equal to the second acceleration if the host vehicle driving speed is smaller than or equal to first driving speed, or the required acceleration is smaller than or equal to first acceleration.

According to an exemplary embodiment of the present disclosure, the vehicle control method may further include performing, by use of the first brake and the second brake, the braking control by the processor if the other-vehicle acceleration exceeds second acceleration and the required acceleration exceeds the second acceleration if the host vehicle driving speed is smaller than or equal to first driving speed, or the required acceleration is smaller than or equal to first acceleration.

According to an exemplary embodiment of the present disclosure, the vehicle control method may further include determining, by the processor, whether to use the first brake if at least one of the host vehicle driving speed, the required acceleration, the other-vehicle acceleration, or an error between the required acceleration and the host vehicle acceleration, or any combination thereof satisfies a predetermined condition, and performing, by use of the first brake and the second brake, the braking control by the processor if it is identified that the first brake is not used.

According to an exemplary embodiment of the present disclosure, the vehicle control method may further include determining, by the processor, whether to use the first brake if at least one of the host vehicle driving speed, the required acceleration, the other-vehicle acceleration, or an error between the required acceleration and the host vehicle acceleration, or any combination thereof satisfies a predetermined condition, and decreasing, by the processor, a first control amount for the first brake and increasing a second control amount for the second brake if it is identified that the first brake is being used.

According to an exemplary embodiment of the present disclosure, the vehicle control method may further include gradually decreasing, by the processor, the first control amount for the first brake based on the same slope, and increasing, by the processor, the second control amount for the second brake to follow the required acceleration.

According to an exemplary embodiment of the present disclosure, the vehicle control method may further include performing, by the processor, the braking control through the second brake based on the second control amount if the host vehicle acceleration, the required acceleration, and the braking pressure satisfy a predetermined condition.

According to an exemplary embodiment of the present disclosure, the vehicle control method may further include determining, by the processor, that the predetermined condition is satisfied, if the host vehicle acceleration is smaller than or equal to third acceleration, the required acceleration is greater than or equal to fourth acceleration, and the braking pressure is greater than or equal to a predetermined value.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
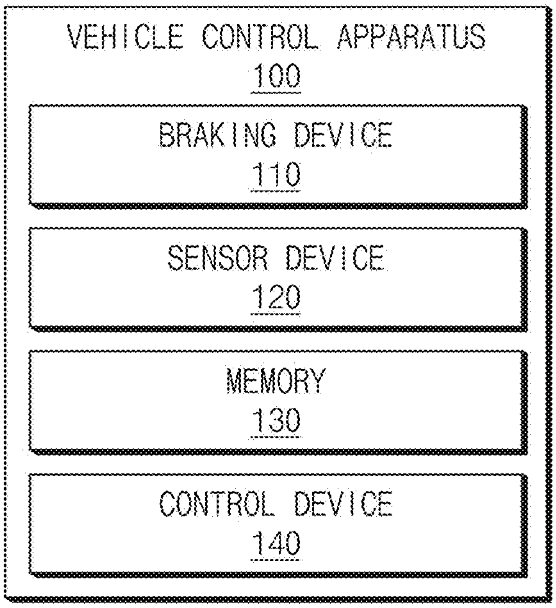
FIG. 1 is a block diagram showing components of a vehicle control apparatus, according to an exemplary embodiment of the present disclosure.

With regard to description of drawings, the same or similar components will be marked by the same or similar reference signs.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to components of each drawing, it should be noted that the same components include the same reference numerals, although they are indicated on another drawing. Furthermore, in describing the exemplary embodiments of the present disclosure, detailed descriptions associated with well-known functions or configurations will be omitted if they may make subject matters of the present disclosure unnecessarily obscure.

In describing elements of an exemplary embodiment of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as including a meaning which is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 6.

FIG. 1 is a block diagram showing components of a vehicle control apparatus, according to an exemplary embodiment of the present disclosure.

According to an exemplary embodiment of the present disclosure, a vehicle control apparatus 100 may include a braking device 110, a sensor device 120, a memory 130, and/or a control device 140. The configuration of the vehicle control apparatus 100 shown in FIG. 1 is an example, and embodiments of the present disclosure are not limited thereto. For example, the vehicle control apparatus 100 may further include components not shown in FIG. 1 (e.g., at least one of a communication device, an interface device, a display device, or a notification device, or any combination thereof).

According to an exemplary embodiment of the present disclosure, the braking device 110 may include at least one braking device.

For example, the braking device 110 may include a first braking device and a second braking device.

For example, the first braking device may be an auxiliary braking device, and the second braking device may be a main braking device. For example, the first braking device may include a braking device with a maximum braking output weaker than the second braking device.

According to an exemplary embodiment of the present disclosure, the sensor device 120 may obtain (or sense) various pieces of information used for vehicle driving.

For example, the sensor device 120 may include at least one sensor including at least one of a camera, radio detection and ranging (RADAR), or a Light Detection and Ranging (LiDAR), or any combination thereof.

For example, the sensor device 120 may obtain, based on at least one sensor, information related to an external object (e.g., at least one of a person, another vehicle, a building, or a structure, or any combination thereof).

For example, the sensor device 120 may obtain information related to driving environments of the host vehicle. For example, the sensor device 120 may obtain information related to at least one of host vehicle driving speed, host vehicle acceleration, or a driving direction, or any combination thereof.

For example, the sensor device 120 may obtain information related to an operating status of at least part of the components of the vehicle control apparatus 100 and/or parameters generated according to an operation. For example, the sensor device 120 may obtain the braking pressure generated through operation of at least part (e.g., the second braking device) of the braking device 110. For example, the sensor device 120 may obtain information related to whether each of the braking devices included in the braking device 110 operates, and an operating history thereof.

For example, the sensor device 120 may obtain information related to whether at least one other vehicle is present, and/or a driving state (e.g., at least one of driving speed, acceleration, a driving direction, a distance from a host vehicle, or whether a vehicle is stopped, or any combination thereof) of at least one other vehicle.

According to an exemplary embodiment of the present disclosure, the memory 130 may store instructions or data. For example, the memory 130 may store one or more instructions that cause the vehicle control apparatus 100 to perform various operations if executed by the control device 140.

For example, the memory 130 and the control device 140 may be implemented as one chipset. The control device 140 may include at least one of a communication processor or a modem.

For example, the memory 130 may store various pieces of information related to the vehicle control apparatus 100. For example, the memory 130 may store information related to the operating history of the control device 140. For example, the memory 130 may store information related to states and/or operations of components (e.g., at least one of an engine control unit (ECU), the braking device 110, the sensor device 120, or the memory 130, or any combination thereof) of the host vehicle.

For example, the memory 130 may include different types of storage devices. For example, the memory 130 may include at least one of a random-access memory (RAM), or an embedded multi-media card (eMMC), or any combination thereof.

For example, the RAM may temporarily (or transiently) store data (e.g., driving data) regarding the operation of the vehicle control apparatus 100 and/or the host vehicle to be controlled by the vehicle control apparatus 100. For example, the RAM may include at least one buffer. For example, the vehicle control apparatus 100 may store, in the RAM, at least one node from dividing pieces of data, which are collected (or identified) while autonomous driving control is performed on the host vehicle, based on unit times.

For example, the eMMC may include an embedded multimedia card. For example, the eMMC may store data for a longer period of time than the RAM. For example, the eMMC may be implemented as a separate memory chip separate from the RAM.

According to an exemplary embodiment of the present disclosure, the control device 140 may be operatively connected to the memory 130. For example, the control device 140 may be configured for controlling the operation of the memory 130.

For example, the control device 140 may identify (or obtain) a braking trigger signal for the host vehicle.

For example, the braking trigger signal may be obtained based on at least one of the host vehicle's driving environment, driving state, or user state, or any combination thereof.

For example, if it is identified that the host vehicle is driving in a specified situation and is driving based on the specified driving state, the control device 140 may obtain the braking trigger signal and may be configured to determine that braking for the host vehicle is necessary.

For example, if the braking trigger signal is identified, the control device 140 may identify braking information.

For example, the braking information may include a real-time driving speed of the host vehicle.

For example, the braking information may include the host vehicle's acceleration (or real-time driving acceleration).

For example, the braking information may include required acceleration. For example, the required acceleration may be the required acceleration determined by the control device 140 based on the driving state of the host vehicle, the driving environment of the host vehicle, and/or the driving state of another vehicle. The control device 140 may perform braking control on the host vehicle based on the required acceleration.

For example, the braking information may include the acceleration of another vehicle. The other vehicle may include at least one vehicle which is driving (or stopping) in front of the host vehicle.

For example, the braking information may include whether a first braking device is used. For example, the control device 140 may identify (or obtain) whether the first braking device including the operating history of the first braking device is used.

For example, the braking information may include braking pressure by a second braking device. For example, the control device 140 may identify (or obtain) the level of braking pressure generated through the second braking device based on the braking information.

For example, the control device 140 may perform, by selectively using the first braking device and the second braking device, braking control on the host vehicle based on the braking information. In other words, the control device 140 may select, based on at least part of various pieces of information included in the braking information, the first braking device and/or the second braking device to be used for braking control.

For example, if the host vehicle driving speed exceeds a first driving speed (e.g., 35 km/h) and the required acceleration exceeds first acceleration (e.g., $-1.7$ m/s$^2$), the control device 140 may perform, based on the first braking device, braking control. In other words, in the instant case, the control device 140 may perform, based on only the first braking device, braking control without using the second braking device.

For example, if identifying that the host vehicle driving speed is smaller than or equal to the first driving speed, the required acceleration is smaller than or equal to the first acceleration, or an error between the required acceleration and the host vehicle acceleration is smaller than or equal to a predetermined error, while the control device 140 is performing, by use of only the first braking device, braking control, the control device 140 may perform, by further using the second braking device, braking control. In the instant case, the control device 140 may be configured to determine that there will be no problem with the stability or accuracy of braking control even though the second braking device is used.

For example, if the host vehicle driving speed is smaller than or equal to the first driving speed, or the required acceleration is smaller than or equal to the first acceleration, the control device 140 may be configured to determine whether to use the first braking device and/or the second braking device, based on levels of other-vehicle acceleration and required acceleration.

For example, if the other-vehicle acceleration is smaller than or equal to second acceleration (e.g., $-1\ m/s^2$) greater than the first acceleration, the control device 140 may perform, based on only the second braking device, braking control without using the first braking device.

For example, if the required acceleration is smaller than or equal to third acceleration (e.g., $-2\ m/s^2$) smaller than the first acceleration, the control device 140 may perform, based on only the second braking device, braking control without using the first braking device.

For example, if the other-vehicle acceleration exceeds the second acceleration and the required acceleration exceeds the third acceleration, the control device 140 may be configured to determine to perform, based on both the first braking device and the second braking device, braking control.

For example, if at least one of the host vehicle driving speed, the required acceleration, the other-vehicle acceleration, or an error between the required acceleration and the host vehicle acceleration, or any combination thereof satisfies a predetermined condition, the control device 140 may identify (or determine) whether to use the first braking device.

For example, if it is determined based on the above-described embodiments to perform, based on both the first braking device and the second braking device, mixed braking control, the control device 140 may identify a usage history of the first braking device.

For example, if it is identified that the first braking device is not used, the control device 140 may perform, by use of the first braking device and the second braking device, braking control. In the instant case, the control device 140 may perform braking control so that the real-time acceleration of the host vehicle follows, based on both the first braking device and the second braking device, the required acceleration based on the general mixed braking control algorithm.

For example, if it is identified that the first braking device is used, the control device 140 may decrease the first control amount for the first braking device and may increase the second control amount for the second braking device. In other words, if a mixed braking control mode is entered when the first braking device is being used, the control device 140 may decrease the control amount (or power amount) transmitted to the first braking device, and may increase the control amount (or power amount) transmitted to the second braking device. Accordingly, the control device 140 may further perform, by further using the second braking device, braking control.

For example, the control device 140 may gradually decrease the first control amount for the first braking device based on the same slope.

For example, the control device 140 may gradually increase the second control amount for the second braking device to follow the required acceleration determined for the braking control.

For example, if the host vehicle acceleration, the required acceleration, and braking pressure satisfy a predetermined condition when the first control amount and second control amount are being adjusted, the control device 140 may perform the braking control by use of the second braking device based on the second control amount.

For example, if the host vehicle acceleration is smaller than or equal to fourth acceleration (e.g., $-1\ m/s^2$), the required acceleration is greater than or equal to fifth acceleration (e.g., $-1.5\ m/s^2$), and the braking pressure is greater than or equal to a specified value (e.g., 0), the control device 140 may be configured to determine that the predetermined condition is satisfied. In other words, if the predetermined condition is satisfied, targeted braking may be achieved through the first braking device. If it is determined based on the level of required acceleration, it may be determined that over-braking may not occur even though the second braking device is used. The control device 140 may be configured to determine that the second braking device is operating (or capable of operating). Accordingly, the control device 140 may be configured to determine that braking control is being performed based on both the first braking device and the second braking device.

The numerical limitations according to the above-described examples are illustrative, and embodiments of the present disclosure are not limited thereto. For example, the numerical limitations for driving speed, acceleration, required acceleration, and braking pressure are illustrative and may be changed by a developer and/or a user's settings.

Figure 2:
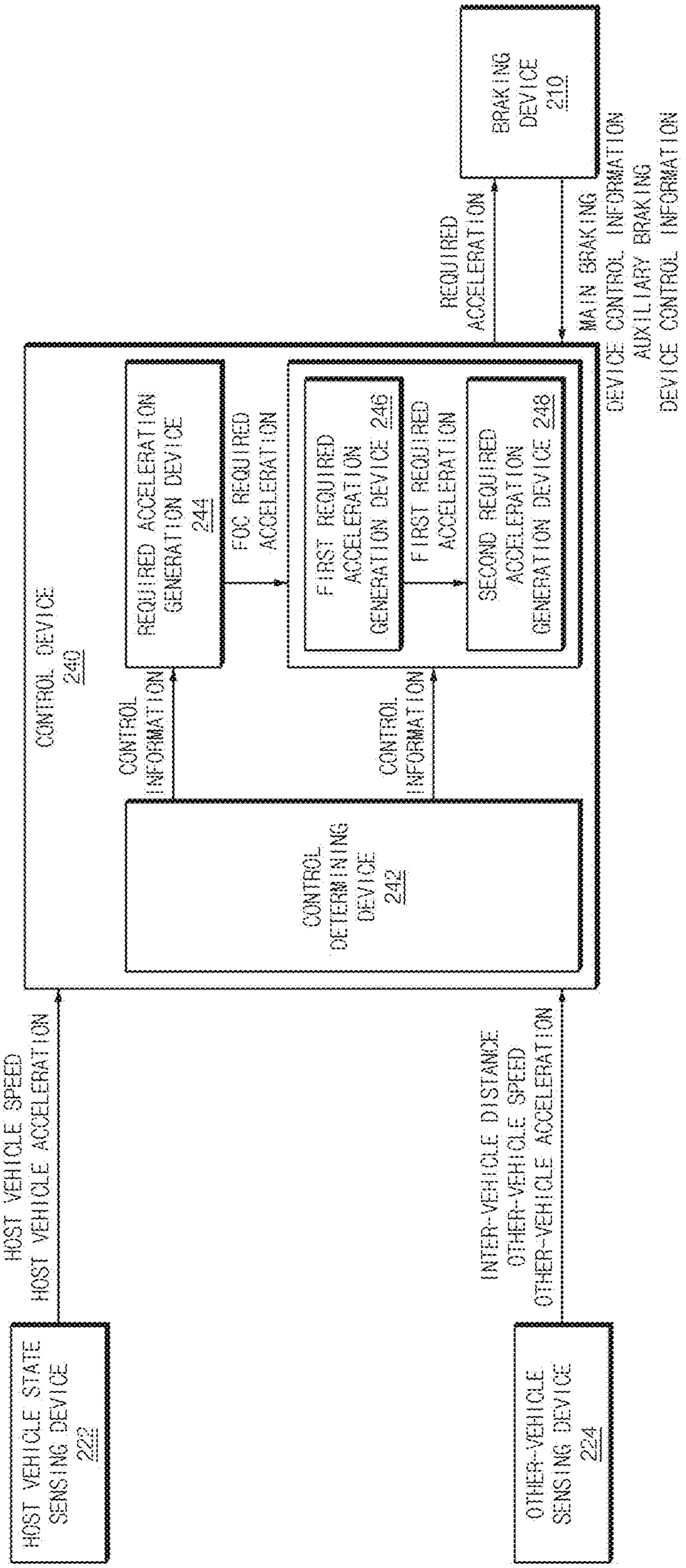
FIG. 2 is a conceptual diagram showing components and operations of a vehicle control apparatus, according to an exemplary embodiment of the present disclosure.

FIG. 2 is a conceptual diagram showing components and operations of a vehicle control apparatus, according to an exemplary embodiment of the present disclosure.

According to an exemplary embodiment of the present disclosure, a vehicle control apparatus (e.g., the vehicle control apparatus 100 of FIG. 1) may include a braking device 210 (e.g., the braking device 110 in FIG. 1), a host vehicle state sensing device 222, an other-vehicle sensing device 224, and a control device 240 (e.g., the control device 140 in FIG. 1). For example, the host vehicle state sensing device 222 and the other-vehicle sensing device 224 may be implemented as a single device (e.g., the sensor device 120 in FIG. 1). For example, the control device 240 may include at least one of a control determining device 242, a required acceleration generation device 244, a first required acceleration generation device 246, or a second required acceleration generation device 248, or any combination thereof.

For example, the control device 240 may obtain, based on the host vehicle state sensing device 222, host vehicle speed and/or host vehicle acceleration.

For example, the control device 240 may obtain, based on the other-vehicle sensing device 224, at least one of an inter-vehicle distance between the host vehicle and the other vehicle, other-vehicle driving speed, or other-vehicle acceleration, or any combination thereof.

For example, the control device 240 may generate, based on at least part of the obtained pieces of information, control information through the control determining device 242. The control information may include a control amount from processing the obtained pieces of information.

For example, the control device 240 may be configured to generate (or determine) the required acceleration (e.g., field oriented control (FOC) required acceleration) through the required acceleration generation device 244 based on the control information.

For example, the control device 240 may be configured to generate first required acceleration and/or second required acceleration based on the first required acceleration generation device 246 and the second required acceleration generation device 248, respectively. Each of the first required acceleration and the second required acceleration may be the required acceleration to be used in a second section P2 and a third section P3 of FIG. 3 to be described later.

For example, the control device 240 may transmit information related to required acceleration including the first required acceleration and the second required acceleration to the braking device 210.

For example, the braking device 210 may perform, based on at least one braking device (e.g., a main braking device and/or an auxiliary braking device), braking control based on the required acceleration.

For example, the braking device 210 may deliver pieces of information (e.g., main braking device control information and/or auxiliary braking device control information) generated in a process of performing braking control to the control device 240.

According to an exemplary embodiment of the present disclosure, each of the control determining device 242, the required acceleration generation device 244, the first required acceleration generation device 246, and the second required acceleration generation device 248 may be implemented by a processor separately. Alternatively, the control determining device 242, the required acceleration generation device 244, the first required acceleration generation device 246, and the second required acceleration generation device 248 may be integrated in a single processor.

Figure 3:
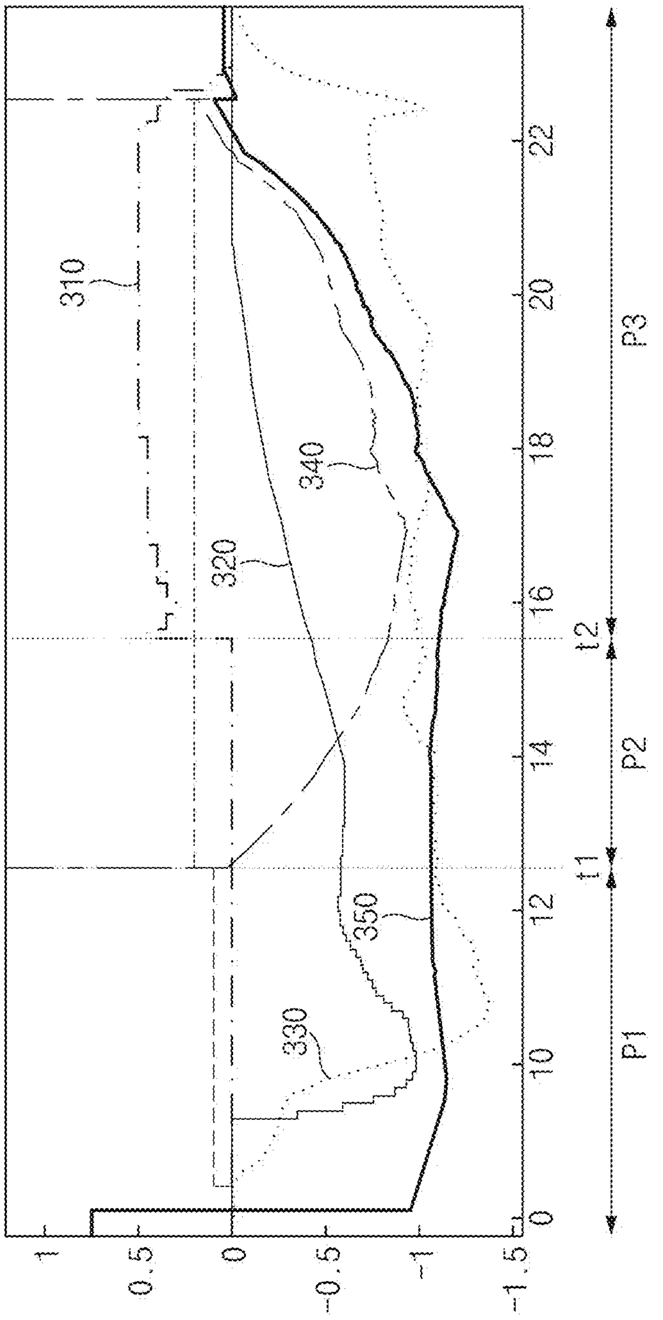
FIG. 3 is a graph illustrating changes in control parameters according to an operation of a vehicle control apparatus, according to an exemplary embodiment of the present disclosure.

FIG. 3 is a graph illustrating changes in control parameters according to an operation of a vehicle control apparatus, according to an exemplary embodiment of the present disclosure.

According to an exemplary embodiment of the present disclosure, a vehicle control apparatus (e.g., the vehicle control apparatus 100 of FIG. 1) may perform braking control on a host vehicle based on a time flow according to FIG. 3.

For example, reference number 310 may be a graph corresponding to braking pressure generated due to the operation of a main braking device.

For example, reference number 320 may be a graph corresponding to the torque used for operation of an auxiliary braking device.

For example, reference number 330 may be a graph corresponding to the real-time acceleration of a host vehicle.

For example, reference number 340 may be a graph corresponding to the main braking device required acceleration for operation of the main braking device.

For example, reference number 350 may be the required acceleration determined by the vehicle control apparatus. For example, the required acceleration may be a control amount associated with the sum of the main braking device required acceleration and auxiliary braking device required acceleration.

For example, in a first section P1, the vehicle control apparatus may perform, based on only an auxiliary braking device (or an auxiliary brake), braking control. Referring to reference number 350, the vehicle control apparatus may be configured to determine that braking control is necessary and may be configured to determine the required acceleration. The required acceleration for the braking control may be a negative value. Accordingly, the vehicle control apparatus may operate the auxiliary braking device. According to reference number 320, the vehicle control apparatus may be configured to generate torque for operating the auxiliary braking device. According to reference number 330, the real-time acceleration of the host vehicle may be reduced through braking control using only an auxiliary braking device. In other words, the host vehicle may be braked based on a gradually greater deceleration amount.

For example, in the second section P2, the vehicle control apparatus may be configured to determine the first required acceleration for the operation of the main braking device (or main brake). In the second section P2 including a period from a first time point t1 to a second time point t2, for example, the vehicle control apparatus may not actually operate the main brake, but may only determine the control amount for operation of the main brake. According to reference number 340, the vehicle control apparatus may gradually reduce the first control amount for the auxiliary braking device from the second section P2 to the third section P3 based on the same slope. According to reference number 340, the vehicle control apparatus may increase the second control amount for the main braking device to follow the required acceleration according to the reference number 350. In other words, the vehicle control apparatus may increase the second control amount (e.g., an absolute value of main braking device required acceleration) for the main braking device to gradually match the required acceleration.

For example, in the third section P3, the vehicle control apparatus may operate the main braking device based on second control amount according to reference number 340. As the main braking device operates, the braking pressure according to reference number 310 may occur. The vehicle control apparatus may continuously adjust the second control amount according to reference number 340 to follow the required acceleration according to reference number 350. The vehicle control apparatus may continue to gradually reduce the first control amount (or an absolute value of auxiliary braking device required acceleration) according to reference number 320 based on the same slope.

Figure 4:
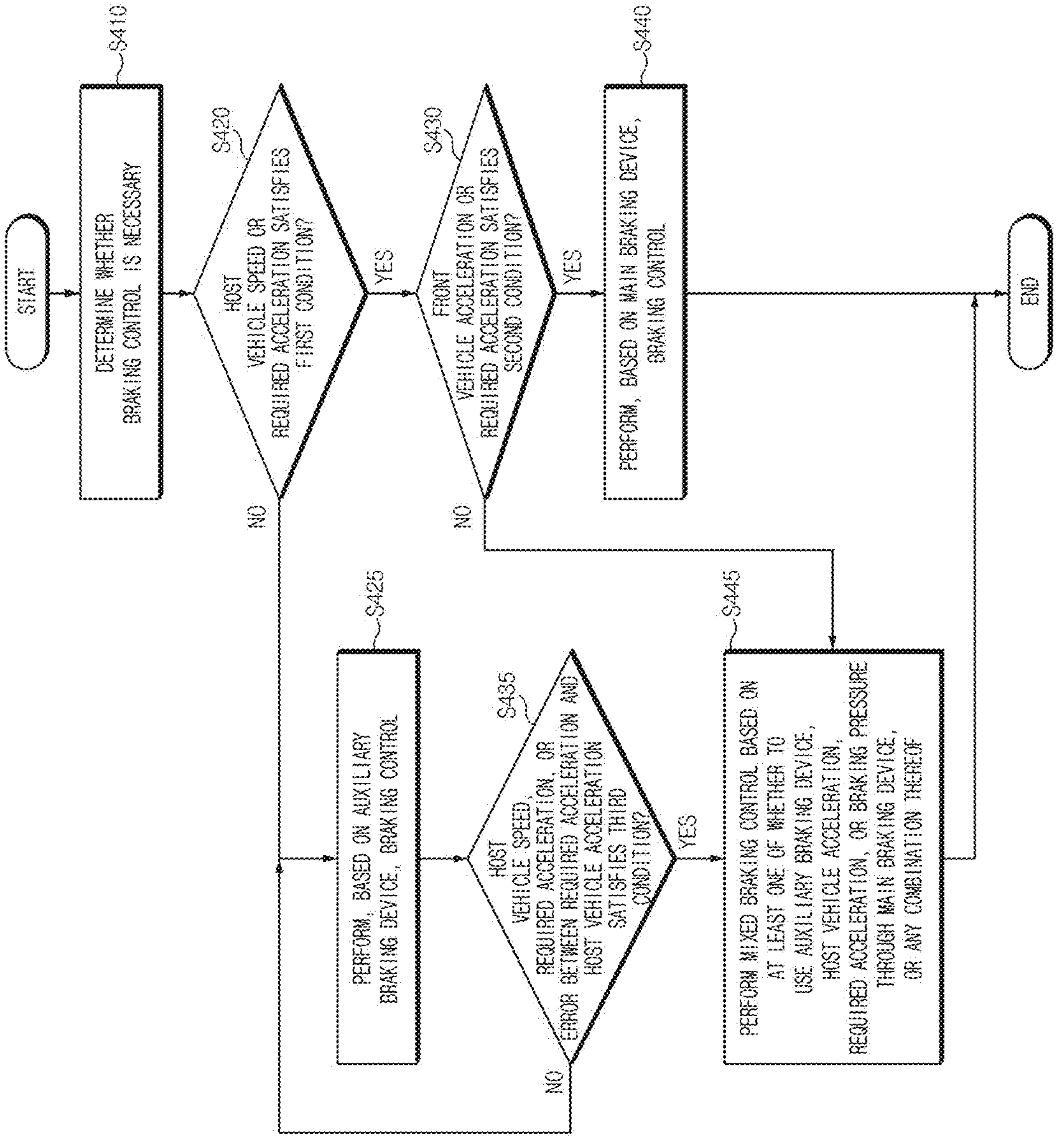
FIG. 4 is a flowchart of a vehicle control method, according to an exemplary embodiment of the present disclosure.

FIG. 4 is a flowchart of a vehicle control method, according to an exemplary embodiment of the present disclosure.

According to an exemplary embodiment of the present disclosure, a vehicle control apparatus (e.g., the vehicle control apparatus 100 of FIG. 1) may perform operations described in FIG. 4. For example, at least some of components (e.g., the braking device 110, the sensor device 120, the memory 130, and/or the control device 140 in FIG. 1) included in the vehicle control apparatus may be configured to perform operations of FIG. 4.

In the following embodiment, S410 to S445 may be sequentially performed, but are not always performed sequentially. For example, the order of operations may be changed, and at least two operations may be performed in parallel. Moreover, descriptions corresponding to or identical to the above-mentioned descriptions provided with reference to FIG. 4 may be briefly described or omitted to avoid redundancy.

According to an exemplary embodiment of the present disclosure, the vehicle control apparatus may be configured to determine whether braking control for the host vehicle is necessary (S410).

For example, the vehicle control apparatus may be configured to determine whether the braking control for the host vehicle is necessary, based on at least one of the host vehicle's driving state, the host vehicle's driving environment, at least one other vehicle's driving state, or an inter-vehicle distance, or any combination thereof.

According to an exemplary embodiment of the present disclosure, if it is identified that braking control is necessary, the vehicle control apparatus may be configured to determine whether the host vehicle speed or required acceleration satisfies a first condition (S420).

For example, if it is determined that the braking control is necessary, the vehicle control apparatus may be configured to determine the required acceleration based on at least one of the host vehicle's driving state, the host vehicle's driving environment, at least one other vehicle's driving state, or an inter-vehicle distance, or any combination thereof.

For example, if the host vehicle speed is smaller than or equal to first speed (e.g., 35 km/h) or the required acceleration is smaller than or equal to first acceleration (e.g., −1.7 m/s$^2$), the vehicle control apparatus may be configured to determine that the first condition is satisfied.

For example, if the host vehicle speed or required acceleration satisfies a first condition (e.g., S420—Yes), the vehicle control apparatus may perform S430.

For example, if the host vehicle speed or required acceleration does not satisfy the first condition (e.g., S420—No), the vehicle control apparatus may perform S425.

According to an exemplary embodiment of the present disclosure, the vehicle control apparatus may be configured to determine (or identify) whether front vehicle acceleration or required acceleration satisfies a second condition (S430).

For example, the front vehicle acceleration is greater than or equal to the second acceleration (e.g., −1 m/s$^2$) greater than the first acceleration or the required acceleration is smaller than or equal to third acceleration (e.g., −2 m/s$^2$) smaller than the first acceleration, the vehicle control apparatus may be configured to determine that the second condition is satisfied.

For example, if the front vehicle acceleration or the required acceleration satisfies the second condition (e.g., S430—Yes), the vehicle control apparatus may perform S440.

For example, if the front vehicle acceleration or required acceleration does not satisfy the second condition (e.g., S430—No), the vehicle control apparatus may perform S445.

According to an exemplary embodiment of the present disclosure, the vehicle control apparatus may perform, based on the main braking device, braking control (S440).

For example, the vehicle control apparatus may perform, based on only the main braking device, braking control based on the required acceleration without using an auxiliary braking device.

According to an exemplary embodiment of the present disclosure, the vehicle control apparatus may perform, based on an auxiliary braking device, braking control (S425).

For example, the vehicle control apparatus may perform, based on preferentially using the auxiliary braking device, braking control based on the required acceleration.

According to an exemplary embodiment of the present disclosure, the vehicle control apparatus may be configured to determine (or identify) whether host vehicle speed, required acceleration, or an error between the required acceleration and the host vehicle acceleration satisfies a third condition (S435).

For example, if the host vehicle speed is smaller than or equal to first speed, the required acceleration is smaller than or equal to first required acceleration, or the error between the required acceleration and the real-time acceleration of the host vehicle is smaller than or equal to a predetermined error (e.g., 0.3), the vehicle control apparatus may be configured to determine that the third condition is satisfied.

For example, if the host vehicle speed, the required acceleration, or the error between the required acceleration and the host vehicle acceleration satisfies the third condition (e.g., S435—Yes), the vehicle control apparatus may perform S445.

For example, if the host vehicle speed, the required acceleration, or the error between the required acceleration and the host vehicle acceleration does not satisfy the third condition (e.g., S435—No), the vehicle control apparatus may repeat S425.

According to an exemplary embodiment of the present disclosure, the vehicle control apparatus may perform mixed braking control based on at least one of whether to use the auxiliary braking device, the host vehicle acceleration, the required acceleration, or braking pressure through the main braking device, or any combination thereof (S445).

For example, if it is identified that the auxiliary braking device does not currently operate, the vehicle control apparatus may perform, based on both the auxiliary braking device and the main braking device, braking control. The vehicle control apparatus may perform braking control based on a typical braking control algorithm.

For example, if it is identified that the auxiliary braking device is currently operating, the vehicle control apparatus may decrease the control amount for the first braking device and may increase the second control amount for the second braking device.

For example, the vehicle control apparatus may gradually decrease the first control amount for the first braking device based on the same slope, and may increase the second control amount for the second braking device to follow the required acceleration.

For example, if the host vehicle acceleration, the required acceleration, and the braking pressure satisfy a predetermined condition, the vehicle control apparatus may perform braking control through the second braking device based on the second control amount. For example, if the host vehicle acceleration is smaller than or equal to fourth acceleration (e.g., −1 m/s$^2$), the required acceleration is greater than or equal to fifth acceleration (e.g., −1.5 m/s$^2$), and the braking pressure is greater than or equal to a specified value (e.g., 0), the vehicle control apparatus may be configured to determine that the predetermined condition is satisfied.

Figure 5:
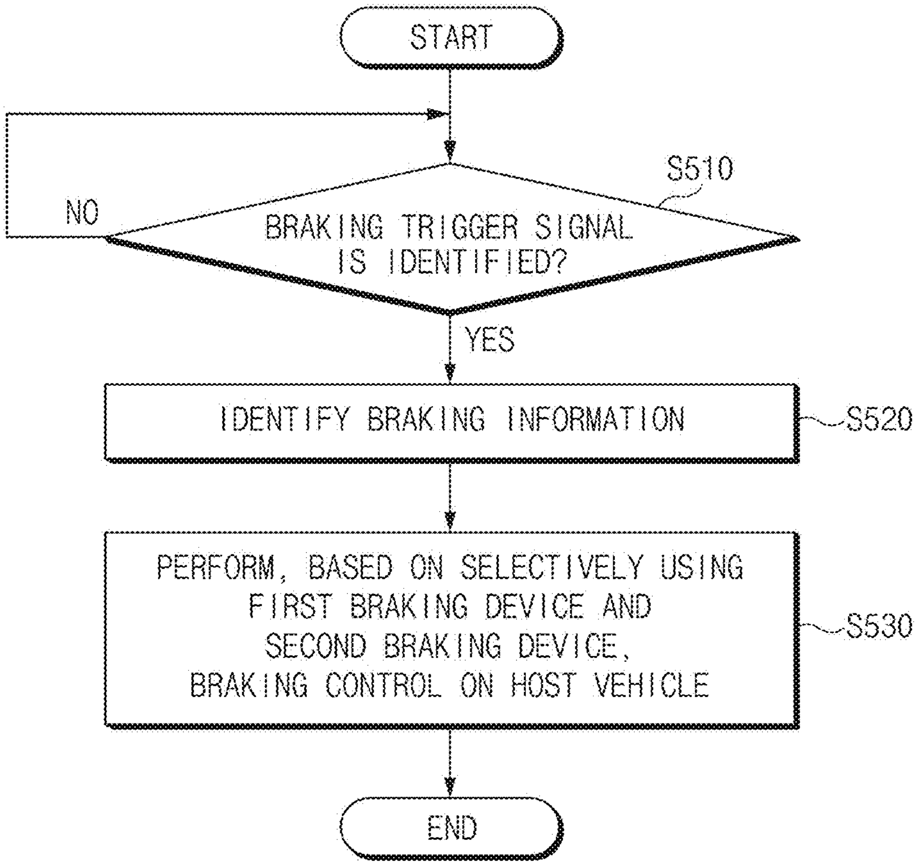
FIG. 5 is a flowchart of a vehicle control method, according to an exemplary embodiment of the present disclosure.

FIG. 5 is a flowchart of a vehicle control method, according to an exemplary embodiment of the present disclosure.

According to an exemplary embodiment of the present disclosure, a vehicle control apparatus (e.g., the vehicle control apparatus 100 of FIG. 1) may perform operations described in FIG. 5. For example, at least some of components (e.g., the braking device 110, the sensor device 120, the memory 130, and/or the control device 140 in FIG. 1) included in the vehicle control apparatus may be configured to perform operations of FIG. 5.

In the following embodiment, S510 to S530 may be sequentially performed, but are not always performed sequentially. For example, the order of operations may be changed, and at least two operations may be performed in parallel. Moreover, descriptions corresponding to or identical to the above-mentioned descriptions provided with reference to FIG. 5 may be briefly described or omitted to avoid redundancy.

According to an exemplary embodiment of the present disclosure, the vehicle control apparatus may identify (or obtain) a braking trigger signal (S510).

For example, the vehicle control apparatus may identify a braking trigger signal occurring if braking control for a host vehicle is necessary, based on at least one of the host vehicle's driving state, the host vehicle's driving environment, at least one other vehicle's driving state, or an inter-vehicle distance, or any combination thereof.

For example, if the braking trigger signal is identified (e.g., S510—Yes), the vehicle control apparatus may perform S520.

For example, if the braking trigger signal is not identified (e.g., S510—No), the vehicle control apparatus may repeat S510.

According to an exemplary embodiment of the present disclosure, the vehicle control apparatus may identify braking information (S520).

For example, the braking information may include a real-time driving speed of the host vehicle.

For example, the braking information may include the host vehicle's acceleration (or real-time driving acceleration).

For example, the braking information may include required acceleration. For example, the required acceleration may be the required acceleration determined by the vehicle control apparatus based on the driving state of the host vehicle, the driving environment of the host vehicle, and/or the driving state of another vehicle. The vehicle control apparatus may perform braking control on the host vehicle based on the required acceleration.

For example, the braking information may include the acceleration of another vehicle. The other vehicle may include at least one vehicle which is driving (or stopping) in front of the host vehicle.

For example, the braking information may include whether a first braking device is used. For example, the vehicle control apparatus may identify (or obtain) whether a first braking device including the operating history of the first braking device is used.

For example, the braking information may include braking pressure by a second braking device. For example, the vehicle control apparatus may identify (or obtain) the level of braking pressure generated through the second braking device based on the braking information.

According to an exemplary embodiment of the present disclosure, the vehicle control apparatus may perform, based on selectively using the first braking device and a second braking device, braking control on the host vehicle based on the braking information (S530).

Figure 6:
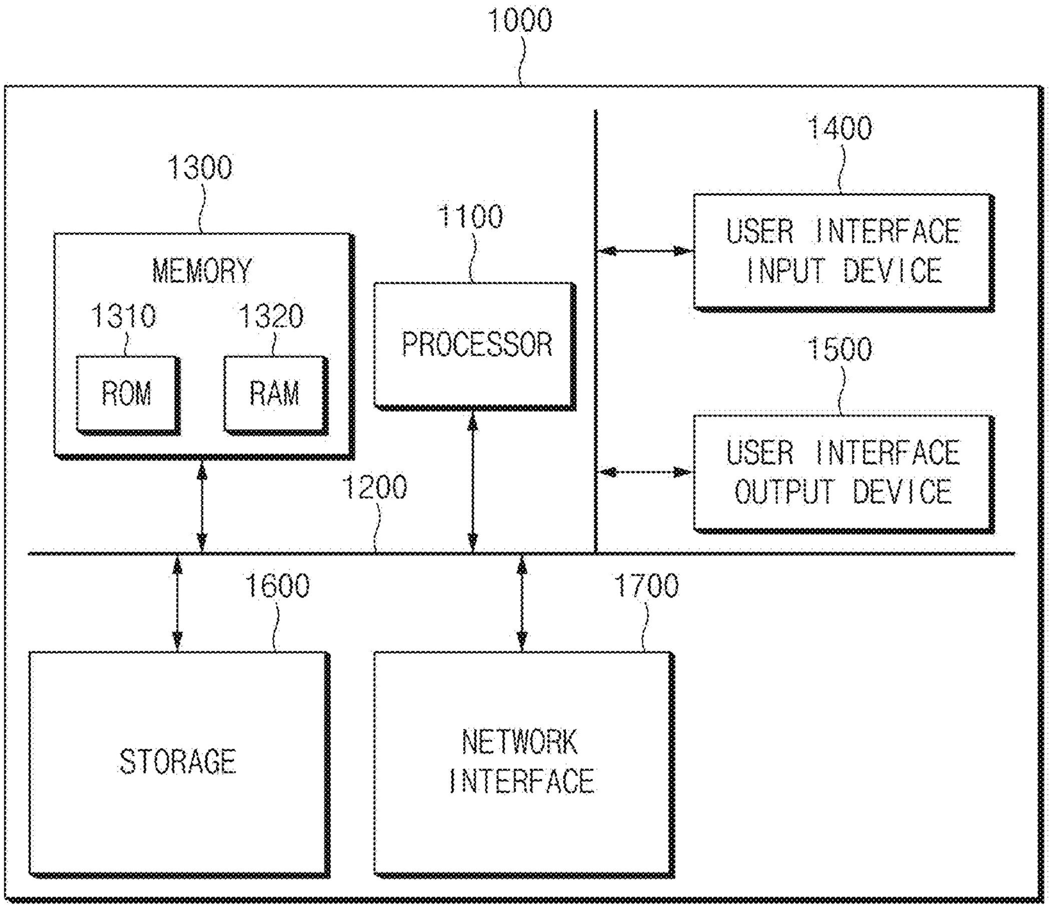
FIG. 6 shows a computing system related to a vehicle control apparatus or vehicle control method, according to an exemplary embodiment of the present disclosure.

FIG. 6 shows a computing system related to a vehicle control apparatus or vehicle control method, according to an exemplary embodiment of the present disclosure.

Referring to FIG. 6, a computing system 1000 related to a vehicle control apparatus or a vehicle control method may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

Accordingly, various exemplary embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Descriptions of a vehicle control apparatus according to an exemplary embodiment of the present disclosure, and a method therefor are as follows.

According to various embodiments of the present disclosure, a vehicle control apparatus may perform, based on selectively using braking devices, stable and highly accurate braking control based on braking information including at least one of host vehicle driving speed, host vehicle acceleration, required acceleration, other-vehicle acceleration, whether to use a first braking device, or braking pressure by a second braking device, or any combination thereof.

According to various embodiments of the present disclosure, a vehicle control apparatus may perform braking control based on selectively adjusting magnitudes of the control amount corresponding to a first braking device (e.g., auxiliary braking device) and the control amount corresponding to a second braking device (e.g., a main braking device) depending on whether the first braking device is used.

According to various embodiments of the present disclosure, a vehicle control apparatus may prevent, based on preferentially using the first braking device, overheating and/or wear and tear occurring if a stronger braking force of the second braking device continues to be used, and may selectively use the second braking device depending on whether a predetermined condition is satisfied.

According to various embodiments of the present disclosure, a vehicle control apparatus may prevent over-braking and/or under-braking that occurs during the transition between usage modes of the first braking device and the second braking device, and may perform braking control that more accurately follows the required acceleration.

Besides, a variety of effects directly or indirectly understood through the present disclosure may be provided.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operably may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle driving control apparatus, comprising:

at least a brake including a first brake and a second brake;

at least a sensor;

a memory configured to store at least one instruction; and a processor operatively connected to the memory, the at least a brake and the at least a sensor, wherein the at least one instruction executed by the processor, causes the processor to:

identify, by use of the at least a sensor, braking information including host vehicle driving speed, host vehicle acceleration, required acceleration, other-vehicle acceleration, whether to use the first brake, and braking pressure by the second brake, in response that a braking trigger signal for a host vehicle is identified; and perform, by selectively using the first brake and the second brake, braking control for the host vehicle based on the braking information.

2. The vehicle driving control apparatus of claim 1, wherein the at least one instruction executed by the processor, further causes the processor to:

in response that the host vehicle driving speed exceeds a first driving speed and the required acceleration exceeds a first acceleration:

perform, by use of the first brake, the braking control.

3. The vehicle driving control apparatus of claim 2, wherein the at least one instruction executed by the processor, further causes the processor to:

perform, by further using the second brake, the braking control in response to identifying that the host vehicle driving speed is smaller than or equal to the first driving speed, the required acceleration is smaller than or equal to the first acceleration, or an error between the required acceleration and the host vehicle acceleration is smaller than or equal to a predetermined error, while performing, by use of the first brake, the braking control.

4. The vehicle driving control apparatus of claim 1, wherein the at least one instruction executed by the processor, further causes the processor to:

in response that the host vehicle driving speed is smaller than or equal to a first driving speed, or the required acceleration is smaller than or equal to a first acceleration, perform, by use of the second brake, the braking control in response that the other-vehicle acceleration is smaller than or equal to a second acceleration or the required acceleration is smaller than or equal to the second acceleration.

5. The vehicle driving control apparatus of claim 1, wherein the at least one instruction executed by the processor, further causes the processor to:

in response that the host vehicle driving speed is smaller than or equal to a first driving speed, or the required acceleration is smaller than or equal to a first acceleration, perform, by use of the first brake and the second brake, the braking control in response that the other-vehicle acceleration exceeds a second acceleration and the required acceleration exceeds the second acceleration.

6. The vehicle driving control apparatus of claim 1, wherein the at least one instruction executed by the processor, further causes the processor to:

determine whether to use the first brake in response that at least one of the host vehicle driving speed, the required acceleration, the other-vehicle acceleration, or an error between the required acceleration and the host vehicle acceleration, or any combination thereof satisfies a predetermined condition; and perform, by use of the first brake and the second brake, the braking control in response to concluding that the first brake is not used.

7. The vehicle driving control apparatus of claim 1, wherein the at least one instruction executed by the processor, further causes the processor to:

determine whether to use the first brake in response that at least one of the host vehicle driving speed, the required acceleration, the other-vehicle acceleration, or an error between the required acceleration and the host vehicle acceleration, or any combination thereof satisfies a predetermined condition; and decrease a control amount for the first brake in response to concluding that the first brake is being used.

8. The vehicle driving control apparatus of claim 7, wherein the at least one instruction executed by the processor, further causes the processor to:

decrease a first control amount for the first brake based on a same slope; and increase a second control amount for the second brake to follow the required acceleration.

9. The vehicle driving control apparatus of claim 8, wherein the at least one instruction executed by the processor, further causes the processor to:

perform the braking control by use of the second brake based on the second control amount in response that the host vehicle acceleration, the required acceleration, and the braking pressure satisfy a predetermined condition.

10. The vehicle driving control apparatus of claim 9, wherein the at least one instruction executed by the processor, further causes the processor to:

conclude that the predetermined condition is satisfied, in response that the host vehicle acceleration is smaller than or equal to a third acceleration, the required acceleration is greater than or equal to a fourth acceleration, and the braking pressure is greater than or equal to a predetermined value.

11. A vehicle control method, comprising:

identifying, by use of at least a sensor, braking information including host vehicle driving speed, host vehicle acceleration, required acceleration, other-vehicle acceleration, whether to use a first brake, and braking pressure by a second brake, by a processor in response that a braking trigger signal for a host vehicle is identified; and performing, by selectively using the first brake and the second brake, braking control for the host vehicle based on the braking information by the processor.

12. The method of claim 11, further including:

in response that the host vehicle driving speed exceeds a first driving speed and the required acceleration exceeds a first acceleration:

performing, by use of the first brake, the braking control by the processor.

13. The method of claim 12, further including:

performing, by further using the second brake, the braking control by the processor in response to identifying that the host vehicle driving speed is smaller than or equal to the first driving speed, the required acceleration is smaller than or equal to the first acceleration, or an error between the required acceleration and the host vehicle acceleration is smaller than or equal to a predetermined error, while performing, by use of only the first brake, the braking control.

14. The method of claim 11, further including:

in response that the host vehicle driving speed is smaller than or equal to a first driving speed, or the required acceleration is smaller than or equal to a first acceleration, performing, by use of the second brake, the braking control by the processor in response that the other-vehicle acceleration is smaller than or equal to a second acceleration or the required acceleration is smaller than or equal to the second acceleration.

15. The method of claim 11, further including:

in response that the host vehicle driving speed is smaller than or equal to a first driving speed, or the required acceleration is smaller than or equal to a first acceleration, performing, by use of the first brake and the second brake, the braking control by the processor in response that the other-vehicle acceleration exceeds a second acceleration and the required acceleration exceeds the second acceleration.

16. The method of claim 11, further including:

determining, by the processor, whether to use the first brake in response that at least one of the host vehicle driving speed, the required acceleration, the other-vehicle acceleration, or an error between the required acceleration and the host vehicle acceleration, or any combination thereof satisfies a predetermined condition; and performing, by use of the first brake and the second brake, the braking control by the processor in response to concluding that the first brake is not used.

17. The method of claim 11, further including:

determining, by the processor, whether to use the first brake in response that at least one of the host vehicle driving speed, the required acceleration, the other-vehicle acceleration, or an error between the required acceleration and the host vehicle acceleration, or any combination thereof satisfies a predetermined condition; and decreasing, by the processor, a first control amount for the first brake and increasing a second control amount for the second brake in response to concluding that the first brake is being used.

18. The method of claim 17, further including:

decreasing, by the processor, the first control amount for the first brake based on a same slope; and increasing, by the processor, the second control amount for the second brake to follow the required acceleration.

19. The method of claim 18, further including:

performing, by the processor, the braking control through the second brake based on the second control amount in response that the host vehicle acceleration, the required acceleration, and the braking pressure satisfy a predetermined condition.

20. The method of claim 19, further including:

determining, by the processor, that the predetermined condition is satisfied, in response that the host vehicle acceleration is smaller than or equal to a third acceleration, the required acceleration is greater than or equal to a fourth acceleration, and the braking pressure is greater than or equal to a predetermined value.

* * * * *